3,170,327
ELECTRIC CURRENT INDICATING APPARATUS
Pascal R. Powell, 9271 Catherine, Garden Grove, Calif.
Filed Nov. 13, 1961, Ser. No. 151,715
1 Claim. (Cl. 73—343.5)

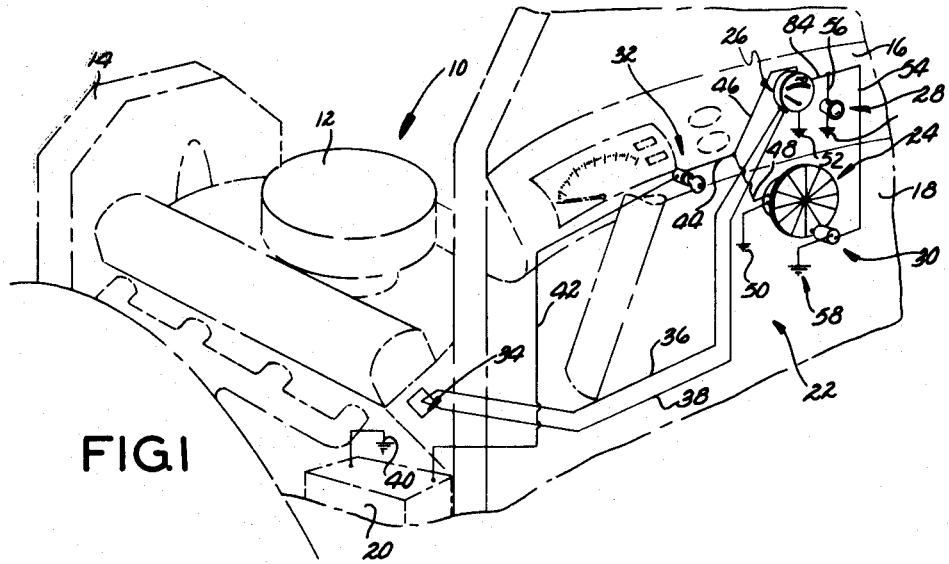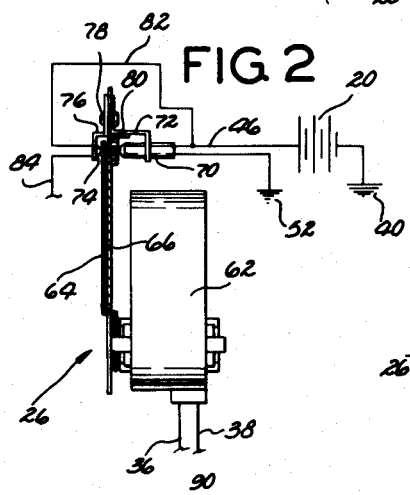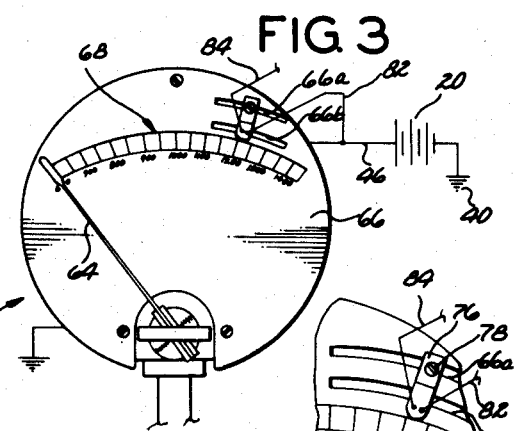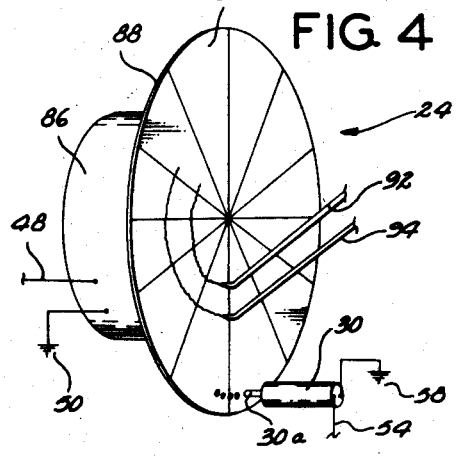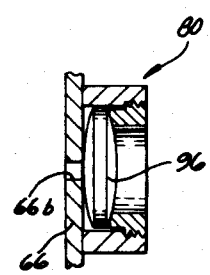
INVENTOR.
PASCAL R. POWELL
BY FULWIDER, MATTINGLY
& HUNTLEY
ATTORNEYS

United States Patent Office 3,170,327
Patented Feb. 23, 1965

The present invention relates to electric current indicating apparatus but more particularly to means for indicating the flow of relatively small amounts of electric current.

For certain applications, it is desirable to employ indicating apparatus which is responsive to extremely small amounts of current flow. Such current flow might be of such small magnitude as to be incapable of directly performing the work necessary for actuating a stylus on a graph or for controlling the operation of a pair of switch contacts. It has been found that for many applications the current flow is so small that even if it is capable of directly actuating a visual or audible indicating device, a great deal of sensitivity is lost. Thus it has become very desirable to provide a device which is very sensitive to changes in relatively small current flows, and which will provide suitable indication thereof at substantially no cost to the relatively small energy of such current flow. Only in this manner can the desired sensitivity be maintained so as to provide accurate indication of the existing condition.

One of the fields wherein the above noted need has been particularly acute, is the field of pyrometry wherein it is desired to measure or indicate changes in temperature of a thermoelectric generator. As is well realized, thermoelectric generators do not produce an appreciable electrical potential and thus are incapable of affording a significant current flow.

A typical application of pyrometric apparatus employing a thermocouple or thermoelectric generator as noted above, is for purposes of maintaining the operating temperature of an internal combustion engine below a predetermined maximum safe value. That is, it has been found injurious for certain types of engines to be operated above a predetermined safe temperature limit. A thermoelectric generator can be employed to sense the temperature changes of the engine, and the current produced thereby can be measured as an indication of the temperature of the engine. However, such current flow is extremely small as noted above.

In view of the foregoing it is a primary object of the present invention to provide apparatus for accurately indicating the flow of relatively small amounts of current.

Another object of this invention is to provide current indicating apparatus which is required to perform substantially no work in effecting the indication.

Another object of the present invention is to provide current flow indicating means as characterized above which is required to perform no work other than that necessary to interrupt a beam of light.

Another object of this invention is to provide current indicating apparatus as characterized above which employs a current sensitive meter the indicator of which is operable at a preselected current value to interrupt a beam of light.

Another object is to provide current flow indicating apparatus which comprises photo-electric sensing means to be actuated by the indicator of a current sensitive meter.

Another object of this invention is to provide pyrometric apparatus as characterized above wherein a thermoelectric generator is employed for actuating the current sensitive meter.

Another object of this invention is to provide indicating apparatus as characterized above wherein the photoelectric means is operable to control electro-responsive actuating means.

Another object of this invention is to provide indicating apparatus as characterized above which is simple and inexpensive to manufacture and which is rugged and dependable in operation.

The novel features which I consider characteristic of my invention are set forth with particularity in the appended claim. The device itself, however, both as to its organization and mode of operation, together with additional objects and advantages thereof, will best be understood from the following description of specific embodiments when read in connection with the accompanying drawings, in which:

FIGURE 1 is a phantom perspective view of a motor vehicle utilizing the subject indicating apparatus;

FIGURE 2 is a side elevational view of the meter and photo-electric means employed in the temperature or current indicating apparatus of FIGURE 1;

FIGURE 3 is a front elevational view of the meter of FIGURE 2;

FIGURE 4 is a perspective view of the time-controlled recording device of the apparatus of FIGURE 1;

FIGURE 5 is a fragmentary sectional view of an alternative form of the subject apparatus; and FIG. 6 is a fragmentary enlarged view of a portion of the meter of FIGURE 3.

Like reference characters indicate corresponding parts throughout the several views of the drawings.

Referring to FIGURE 1 of the drawings, the embodiment chosen for illustration of the present invention is shown applied to a motor vehicle 10. Such vehicle, as shown in phantom by interrupted lines, comprises an engine 12, a radiator 14 and a dash board 16 mounted relative to a fire wall 18. Also included in the engine 12 is the usual source of electric power in the form of a storage battery 20, the voltage rating of which is not critical for the present invention as will hereinafter become apparent.

The apparatus of the present invention is identified generally in FIGURE 1 with the numeral 22, and has some of its components mounted on dash board 16 of vehicle 10. As will hereinafter become more apparent as the description of the present invention progresses, such mounting is to enable the operator of the vehicle to view certain of the indicating devices to be hereinafter described, so as to control accordingly the operation of the engine 12. That is, although it is desirable to record the occurrence of predetermined engine temperatures on a permanent graph or other record means, it is most desirable to inform the operator of the vehicle of the engine temperature to permit him to vary its operation so as to maintain such engine temperature within predetermined safe limits.

The apparatus 22 comprises a time-controlled recording device 24, a meter 26, a visual indicating device 28 and an electro-responsive actuating device 30. As shown in FIGURE 1, all of the components are connected in circuit with battery 20 through the usual key-operated ignition switch 32 of the vehicle 10.

For controlling the operation of meter 26, an input source of thermocouple or thermoelectric generator 34 is suitably positioned adjacent the block of engine 12 in heat-sensing relationship therewith. Lead wires 36 and 38 extend through the fire wall 18 of vehicle 10 for connecting generator 34 to meter 36.

One terminal of battery 20 is grounded as at 40, while the other is connected to ignition switch 32 by a lead wire 42. Time-controlled recording device 24 and meter 26 are in parallel circuit arrangement by means of lead wires 44, 46 and 48. Each of such devices is grounded as at 50 and 52 respectively. In parallel circuit arrangement and wider control of meter 26 is a visual indicating device 28 connected to a lead wire 54 by a conductor 56, and an electro-responsive actuating device 30 which is grounded as at 58. Indicating device 28 is also grounded as at 60.

Referring to FIGURES 2, 3 and 6, it is seen that meter 26 comprises a current-sensitive mechanism 62 to be energized by thermoelectric generator 34. Actuating mechanism 62 is of the type which is very sensitive to relatively small current flow for positioning accordingly an indicator 64. Such mechanism 62 may take substantially any desired form, there being various types which are presently available today for response to the relatively small energy afforded by thermoelectric generators.

Meter 26 is further provided with an indicating disc or plate 66 formed with suitable graduations and corresponding indicia as shown at 68. As will be readily apparent to those persons skilled in the art, such indicia may correspond directly to the parameter being measured as for instance the temperature of engine 12. In the alternative, of course, such indicia may indicate the actual values of current flow through operating mechanism 62 of meter 26.

Mounted on opposite sides of the path of travel of indicator 64 is photo-electric means in the form of a light source 70 attached to a mounting bracket 72 and a photo-electric cell 74 fixed to a mounting bracket 76. The brackets 72 and 76 are adjustably fastened relative to indicating plate 66 by a bolt 78 which extends through an elongated slot 66a formed in plate 66. When so positioned, the light source 70 is positioned behind plate 66 while the photo-electric cell 74 is on the front side thereof, there being an adjustment track or elongated slot 66b in plate 66 for permitting the beam of light afforded by source 70 to impinge on cell 74. As will hereinafter be described in greater detail, for certain applications it may be desirable to provide focusing means in the form of an adapter 80 also mounted on bracket 72. As shown most clearly in FIGURE 2 of the drawings, light source 70 is afforded electrical energy from battery 20 through various lead wires including conductor 46. Also energized by battery 20 is a control circuit including photo-electric cell 74, there being a lead wire 82 connected internally of meter 26 for connecting conductor 46 to one side of the cell. The other side of photo-electric cell 74 is connected in circuit with conductors 54 and 56 by a lead wire 84.

Referring to FIGURE 4 of the drawings, the time-controlled recording device 24 comprises a timing motor 86 which is attached to a rotary recording disc 88 which is adapted to carry a suitable recording chart 90. The chart 90 may be utilized to record variations in any other parameters as for instance through the styluses 92 and 94. As will be readily apparent to those persons skilled in the art, the particular type of time-controlled recording device is not critical for the present invention. Rather, any suitable device within the scope of the appended claim will perform satisfactorily in accordance with the present teachings.

Although substantially any kind of electroresponsive actuating device may be employed to perform the function of device 30, the latter device is shown as a solenoid having a movable plunger or armature 30a for making an indication or impression on chart 90. As will hereinafter become more apparent, armature 30a may be spring-biased to either its extended or retracted position depending on the particular method of operation to be employed. If armature 30a is biased to its retracted position, energization of solenoid 30 as effected by completion of the energizing circuit therefor through photo-electric cell 74, will cause armature 30a to engage chart 90. In the alternative, the armature 30a may be biased to its extended position, whereupon operation of cell 74 would have to deenergize solenoid 30 so as to permit such bias to cause armature 30a to contact chart 90. These and other alternative arrangements are contemplated within the scope of this invention.

Under certain environmental conditions, it will be desirable to have the light rays from source 70 impinge directly on the photo-electric cell 74. However, under certain other conditions, as for instance where the ambient light is relatively intense, it may be found desirable to employ means for focusing or directing the beam of light onto the cell, and preventing extraneous or ambient light rays from impinging thereon. To accomplish this, bracket 80 may be fastened to bracket 72 for movement therewith, and may be provided with an optical lens 96 as shown in FIGURE 5.

The apparatus of the present invention operates generally as follows:

Upon turning of the ignition key of vehicle 10 for placing engine 12 in operation, electrical energy is afforded from battery 20 to the time-controlled recording device 24 and to the light source 70 of meter 26. In the event that it is desired to employ chart 90 for the recordation of parameters other than engine temperature, it may be desirable to have motor 86 of device 24 energizable independently of ignition switch 32. However, this is a matter of choice and is not critical with regard to the present invention. In any event, motor 86 will be energized during operation of vehicle 10 so as to effect rotation of chart 90.

Energization of light source 70 causes a beam of light to be impinged on photo-electric cell 74. Such energization of cell 74 completes the energizing circuit for solenoid 30, whereupon the armature 30a thereof is held in retracted position.

As engine 12 increases in temperature with continued operation thereof, a corresponding electrical potential is developed across the cold junctions of the thermoelectric generator 34. This, of course, causes a corresponding amount of current to flow through operating mechanism 62. Indicator 64 of meter 26 is moved accordingly to afford the operator of the vehicle of visual indication of the actual temperature of engine 12. This enables the operator to alter the speed of operation of the engine so as to maintain the temperature thereof within safe limits. With certain types of vehicles as for instance heavy duty trucks and the like, the operating temperature of the engine can also be varied by shifting to a different gear ratio in the vehicle's transmission.

In the event the operator does not heed the warning indicated by the indicator 64 approaching the predetermined critical temperature of the engine, the indicator 64 will ultimately pass between the light source 70 and the photoelectric cell 74. When this happens, the circuit controlling mechanism of cell 74 is moved to open circuit condition, whereupon solenoid 30 is de-energized. This permits the biasing means of solenoid 30 to move armature 30a into engagement with chart 90 to make an appropriate indication. It is contemplated that due to the continuous operation of recording device 24, solenoid 30 might be of the "doorbell" type electromagnetic operator wherein the armature makes and breaks its own energizing circuit whenever it is moved. That is, if solenoid 30 was of this type, as soon as armature 30a engages chart 90 it would re-energize the electromagnetic operator of solenoid 30 so as to effect retraction of the armature. Such retraction, of course, would again open the solenoid circuit, thereby allowing the biasing means to again extend the armature. This action will continue, the armature making a plurality of successive indications in the chart 90 until the dangerous temperature condition has been removed. At this time, the indicator 64 will move out of the path of the beam of light from source 70 so as to close the circuit controlling portion of photoelectric cell 74. Thus solenoid 30 will again be constantly energized.

Although it is a general rule-of-thumb that diesel engines of heavy duty trucks should not be operated over 1200 to 1300 degrees F., the instant invention permits the truck owner to adjust the apparatus for response to substantially any desired temperature. To accomplish this, it is merely necessary to loosen bolt 78 and to slide brackets 72 and 76 as a unit, to the desired temperature position on scale 68. When this has been accomplished, the bolt 78 can be tightened to firmly position the photoelectric means in the selected position.

An indicating light 28 is provided on the dash board 16 of the vehicle 10 to provide a further visual indication of the occurrence of the unsafe temperature condition. That is, indicating light 28 is responsive to interruption of the beam of light as above-explained with respect to solenoid 30. Such indicating light may be on continuously so as to indicate that the meter 26 is operating satisfactorily. In this event, the light 28 would be extinguished as soon as the predetermined critical temperature was reached within the engine 12. Conversely, it may be desirable to have indicating light 28 be de-energized as long as the engine 12 is within safe limits, and to be energized in response to interruption of the beam of light afforded by light source 70. In this event, electro-responsive switch means would have to be employed between meter 26 and indicating light 28 so that interruption of the energizing circuit for solenoid 30 as above-described would complete the energizing circuit for indicating lamp 28. However, the particular way in which this would be accomplished is not critical to the present invention, either method being within the scope of the appended claim.

To prevent operation of the engine 12 above the preselected critical temperature without affording the proper indications, it may be desirable to employ a second photoelectric cell immediately adjacent the cell 74. In this event, the same or different electro-responsive means on the order of solenoid 30 could be employed to indicate actuation of the second or higher temperature photoelectric cell. It would then be a simple matter to examine chart 90 to determine whether the critical temperature was merely reached, or whether it was exceeded. With this arrangement, a true indication would be afforded of all the changes in temperature in the vicinity of the preselected critical temperature.

It is thus seen that the present invention provides a highly sensitive current responsive device. Also, that the present invention is particularly suitable for use in pyrometric apparatus for indicating relatively small changes in temperature of a given source. Additionally the present invention affords both instantaneous visual indication and a permanent record of the occurrence of a predetermined critical temperature. It is contemplated within the scope of this invention that the visual indicating means shown in the drawings and hereinabove described could be replaced by suitable audible indicating means if desired.

Although I have shown and described certain specific embodiments of my invention I am fully aware that many modifications thereof are possible. My invention, therefore, is not to be restricted except insofar as in necessitated by the prior art and by the spirit of the appended claim.

I claim:

Apparatus for indicating the attainment of a predetermined temperature in an engine, said apparatus comprising:

a thermoelectric generator for mounting in heat-sensing relationship with said engine to provide an electrical output varying in accordance with the temperature of said engine;

a meter in circuit with said generator and having an indicator movable in correspondence with said varying electrical output of said generator, said meter including means defining an adjustment track coextensive with a critical range of traverse of said indicator corresponding to a critical temperature range of said engine;

a light source carried by said meter adjacent said adjustment track;

a power source connected to said light source to provide a light beam;

time-controlled recording means in circuit with said power source and including a timing motor and a movable recording chart normally continuously driven by said timing motor at least during operation of said engine;

an electro-responsive device actuable to provide a mark on said chart;

and a light-sensitive means in circuit with said electro-responsive device and carried by said meter adjacent said adjustment track in confronting relationship with said light source, and operative upon interruption of said light beam by said indicator to effect actuation of said electro-responsive device, said light-sensitive means being adjustably movable along said adjustment track to predictably alter the temperature in said critical temperature range at which said electro-responsive device is actuated.

References Cited by the Examiner

UNITED STATES PATENTS

| | | | |
|---|---|---|---|
| 903,090 | 11/08 | Hopkins | 73—346 X |
| 1,136,407 | 4/15 | Carrigan. | |
| 1,690,517 | 11/28 | Wilson | 73—359 X |
| 1,758,450 | 5/30 | Machlet | 73—343 |
| 2,113,610 | 4/38 | Bacon | 73—346 X |
| 2,164,114 | 6/39 | Kolb. | |
| 2,258,369 | 10/41 | Stevenson | 250—231 |
| 2,633,404 | 3/53 | Hathaway | 346—3 X |
| 2,721,109 | 10/55 | Ross | 346—3 |
| 3,010,026 | 11/61 | Schake | 340—266 |
| 3,029,522 | 4/62 | Stolle | 33—174 |

ISAAC LISANN, *Primary Examiner.*